(12) United States Patent
Arriola et al.

(10) Patent No.: US 9,531,437 B1
(45) Date of Patent: Dec. 27, 2016

(54) COMMUNICATION LINE ADAPTER WITH ELECTROMAGNETIC INTERFERENCE PROTECTION

(71) Applicant: Lockheed Martin Corporation, Bethesda, MD (US)

(72) Inventors: Nicholas R. Arriola, Fort Worth, TX (US); John E. Moretta, Hurst, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 15/041,556

(22) Filed: Feb. 11, 2016

(51) Int. Cl.
*H04L 25/00* (2006.01)
*H04B 3/54* (2006.01)
*H04L 12/40* (2006.01)

(52) U.S. Cl.
CPC ............. *H04B 3/546* (2013.01); *H04B 3/548* (2013.01); *H04L 2012/40273* (2013.01)

(58) Field of Classification Search
CPC ............ H04L 25/0272; H04L 25/0292; H01R 13/665; G06F 3/14
USPC .................................. 375/257, 258; 320/107
See application file for complete search history.

(56) References Cited

U.S. PATENT DOCUMENTS

| | | | |
|---|---|---|---|
| 2013/0175979 A1* | 7/2013 | Chang | H02J 7/0042 320/107 |
| 2015/0162675 A1* | 6/2015 | Davidson, Jr. | H01R 9/0521 439/583 |
| 2015/0255930 A1* | 9/2015 | Lee | H02H 3/22 361/91.5 |

* cited by examiner

Primary Examiner — Khai Tran
(74) Attorney, Agent, or Firm — Withrow + Terranova, PLLC (57) ABSTRACT

A communication line adapter with electromagnetic interference (EMI) is provided. The communication line adapter comprises a first interface. The first interface further comprises an EMI shield contact configured to be coupled to an external EMI shield contact and a first data line contact configured to be coupled to a first external data line contact. The communication line adapter further comprises a second interface. The second interface comprises a second data line contact configured to be coupled to a second external data line contact and connected to the first data line contact by a data line. The communication line adapter further comprises an EMI reduction circuit, coupled to the EMI shield contact, configured to protect the first data line from EMI. This allows a discharge at the communication line adapter of an electric charge received at the EMI shield contact of the first interface from the external EMI shield contact.

19 Claims, 6 Drawing Sheets

COMMUNICATION LINE ADAPTER WITH ELECTROMAGNETIC INTERFERENCE PROTECTION

TECHNICAL FIELD

The technology of the disclosure relates generally to communication line adapters. In particular, the technology of the disclosure relates to a communication line adapter with electromagnetic interference protection for connecting elements of a communication system.

BACKGROUND

Vehicles such as automobiles, trucks, and aircrafts may include multiple electronic modules for monitoring and controlling systems such as engines, exhaust emission systems, and ergonomic control systems. As an example, an automobile may include an electronic control module to receive engine performance information from an engine performance module, provide performance information to a user via a user interface module, and provide control commands to the engine performance module to control engine performance. Wiring a vehicle to interconnect the multiple electronic modules to each other may be complex and costly. For example, in vehicles with limited space, wiring the vehicle may add complexity to the design of the vehicle and of electronic modules therein, and may also add cost to the vehicle assembly process. Further, such wiring may complicate replacing or adding electronic modules in the vehicle.

Communication standards that define communication networks for interconnecting electronic modules within a vehicle have been developed to reduce problems associated with wiring vehicles. Such communication networks generally allow multiple electronic modules to share a communication medium, or bus, and communicate among themselves through the shared bus. One such communication network is provided by the controller area network (CAN) bus standard (International Standards Organization (ISO) 11898), designed originally for use within automobiles but commonly used in a wide variety of applications, including industrial automation, heavy machinery, and military vehicles.

Figure 1:
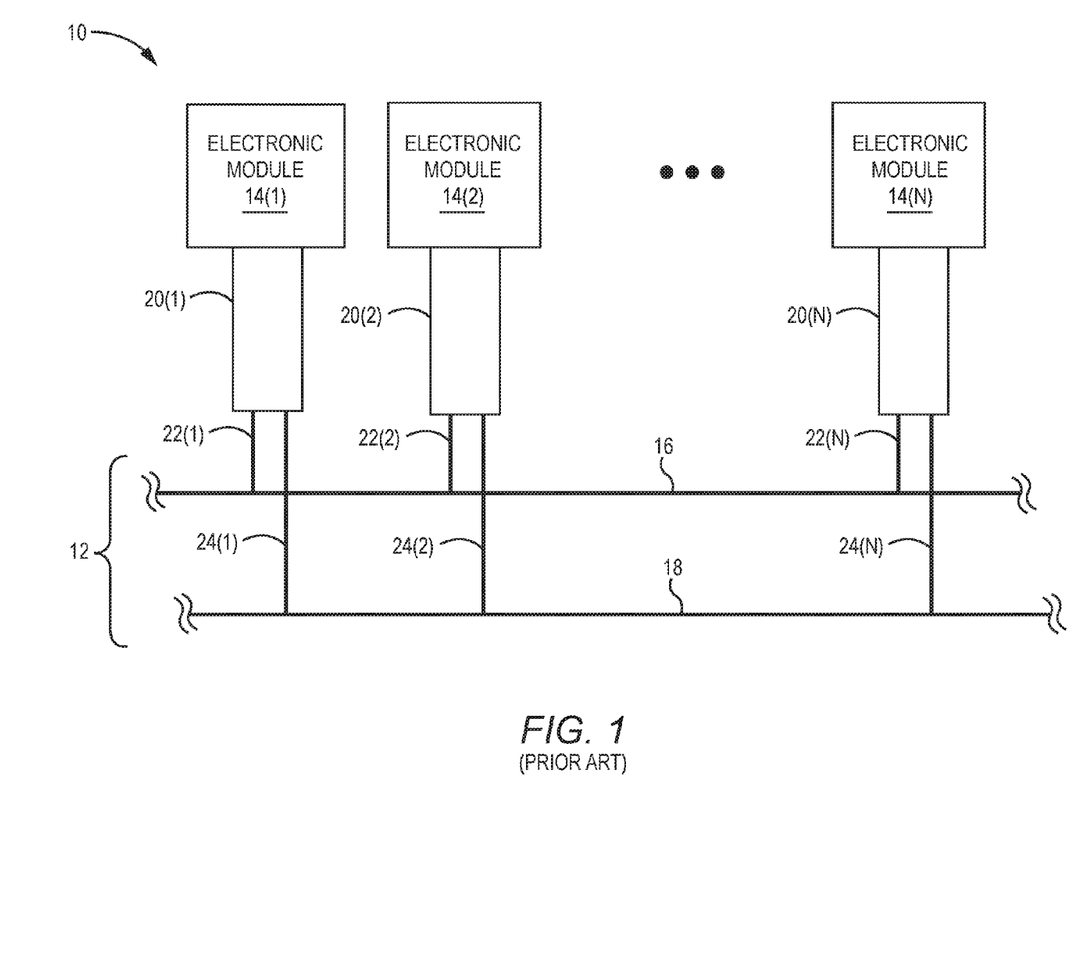
FIG. 1 illustrates a CAN bus network as an example of a communication network for interconnecting electronic modules within a vehicle.

FIG. 1 illustrates a CAN bus network 10 as an example of a communication network for interconnecting electronic modules within a vehicle. The CAN bus network 10 includes a CAN bus 12 and a plurality of electronic modules 14(1)-14(N) (generally, electronic modules 14) interconnected through the CAN bus 12. The electronic modules 14 may include engine control modules, exhaust emission control modules, and ergonomic control modules, for example. The CAN bus 12 includes data lines 16 and 18 for transmitting a differential signal that carries data between the electronic modules 14. The CAN bus network 10 further includes bus connectors 20(1)-20(N) (generally, bus connectors 20), configured to provide a communication path between the electronic modules 14 and the CAN bus 12. In particular, the bus connectors 20 include data lines 22(1)-22(N) and 24(1)-24(N) for electrically coupling a corresponding electronic module 14 to the data lines 16 and 18 of the CAN bus 12, respectively. Accordingly, each of the electronic modules 14 can communicate with each of the other electronic modules 14 through the CAN bus 12 instead of being wired to each of the other electronic modules 14 separately.

Safety considerations may require that such networks provide a high level of reliability in terms of message delivery assurance and physical protection against external elements. For example, in certain environments, electromagnetic interference (EMI) may affect the performance of a network by affecting the voltage/current levels of the network's transmission medium. Therefore, protection against EMI may be necessary to maintain reliable data communications. Accordingly, communication network standards may require or recommend specific ways to protect a corresponding communication medium against EMI. For example, section J1939/11 of the CAN bus standard requires protection against EMI, whereas section J1939/15 of the CAN bus standard does not.

Figure 2:
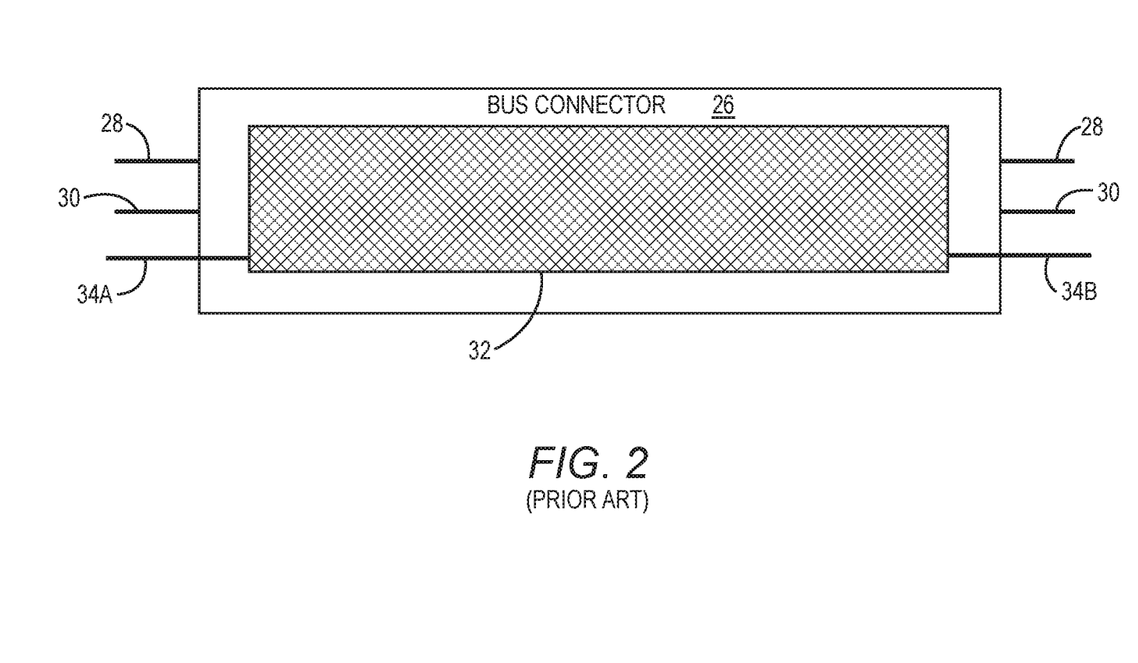
FIG. 2 illustrates a bus connector for connecting an electronic module to a CAN bus illustrated in FIG. 1 according to section J1939/11 of the CAN bus standard.

FIG. 2 illustrates a bus connector 26 for connecting an electronic module 14 to the CAN bus 12 illustrated in FIG. 1 according to section J1939/11 of the CAN bus standard. FIG. 2 will be discussed in conjunction with FIG. 1. The bus connector 26 includes data lines 28 and 30 for connecting an electronic module 14 to the data lines 16 and 18 of the CAN bus 12, respectively. The bus connector 26 further includes an EMI shield 32 for protecting a differential signal carried from the CAN bus 12 from EMI, as required by section J1939/11 of the CAN bus standard. The bus connector 26 further includes EMI shield lines 34A and 34B (generally, EMI shield lines 34) electrically coupled to the EMI shield 32 for discharging an electric charge accumulated at the EMI shield 32. This allows for the electric charge to be discharged into, for example, one or more of the electronic modules 14, thus protecting the differential signal carried by data lines 28 and 30 from EMI.

However, the electronic modules 14 may not be configured to receive or "digest" the EMI shield lines 34 of the bus connector 26 and discharge the electric charge in the EMI shield lines 34. For example, an interface of the electronic module 14(1) (FIG. 1) may not support section J1939/11 of the CAN bus standard, and therefore, may not include a contact line for digesting the EMI shield lines 34 from the bus connector 26 and discharge the electric charge in the EMI shield lines 34. Accordingly, connecting the electronic module 14(1) to the CAN bus 12 using the bus connector 26 leaves the EMI shield lines 34 unterminated on the corresponding end of the bus connector 26. This leaves a corresponding EMI charge in the EMI shield 32 and the corresponding differential signal unprotected from EMI, thus decreasing reliability of communications therein.

SUMMARY

The embodiments relate to a communication line adapter with electromagnetic interference (EMI) protection. The communication line adapter provides a communication path between a network and an electronic module. The communication line adapter includes an EMI reduction circuit that dissipates an electric charge accumulated at an EMI shield of the network, thereby reducing EMI on the network. Otherwise, the communication line adapter allows the electronic module to communicate with the network. Among other advantages, the communication line adapter reduces EMI by dissipating the electric charge and obviates the need for the electronic module to provide circuitry to dissipate the electric charge.

In one non-limiting embodiment, a communication line adapter is provided. The communication line adapter includes a body comprising a first interface having a first predetermined shape configured to be coupled to a first external interface having a first complimentary shape. The first interface further includes an EMI shield contact configured to be coupled to an external EMI shield contact of the first external interface. The first interface further includes a first data line contact configured to be coupled to a first external data line contact of the first external interface. The body further includes a second interface having a second predetermined shape configured to be coupled to a second external interface having a second complimentary shape. The second interface further includes a second data line contact configured to be coupled to a second external data line contact of the second external interface. The body further includes a first data line configured to carry a first electrical current from the first data line contact to the second data line contact. The body further includes an EMI reduction circuit, coupled to the EMI shield contact, configured to protect the first data line from EMI. Coupling the communication line adapter between the first external interface and the second external interface, instead of coupling the first external interface directly to the second external interface, allows a discharge at the communication line adapter of an electric charge received at the EMI shield contact from the first external interface instead of relying on the second external interface to do so.

In another non-limiting embodiment, a method for reducing EMI at a communication line adapter is provided. The method includes receiving, at a first data line contact of a first interface of the communication line adapter, a first electrical current from a first external data line contact of a first external interface coupled to the first interface. The method further includes receiving, at an EMI shield contact of the first interface, an EMI shield electric charge from a first EMI shield line contact of the first external interface coupled to the first interface. The method further includes providing the EMI shield electric charge to an EMI reduction circuit of the communication line adapter, the EMI reduction circuit electrically coupled to a ground connector of the communication line adapter. The method further includes providing, by a second data line contact of a second interface of the communication line adapter, the first electrical current to a second external data line contact of a second external interface coupled to the second interface. The method further includes dissipating, by the EMI reduction circuit and the ground connector, the EMI shield electric charge. By coupling the communication line adapter between the first external interface and the second external interface, instead of coupling the first external interface directly to the second external interface, the method allows a discharge at the communication line adapter of an electric charge received at the EMI shield contact from the first external interface instead of relying on the second external interface to do so.

In another non-limiting embodiment, a communication line adapter is provided. The communication line adapter includes a body comprising a first interface. The first interface includes an EMI shield contact configured to be coupled to an external EMI shield contact. The first interface further includes a first communication port configured to be coupled to a first external communication port. The body further includes a second interface comprising a second communication port configured to be coupled to a second external communication port. The body further includes a transmission medium configured to connect the first communication port to the second communication port. The body further includes an EMI reduction circuit coupled to the EMI shield contact configured to protect the transmission medium from EMI. This allows a discharge at the communication line adapter of an electric charge received at the EMI shield contact of the first interface instead of relying on an external interface, at an electronic module for example, to do so.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first plug" and "second plug," and does not imply a priority, a type, an importance, or other attribute, unless otherwise stated herein.

The embodiments relate to a communication line adapter with electromagnetic interference (EMI) protection. Among other advantages, embodiments disclosed herein provide a discharge path for electric charge accumulated at an EMI shield of a network to reduce EMI, thus allowing for more reliable data communications between the network and electronic modules connected therein. Furthermore, embodiments disclosed herein allow the electronic modules to connect to the network regardless of whether the electronic module is configured to provide a discharge path for the electric charge, obviating the need for the electronic module to provide circuitry to dissipate the electric charge.

Figures 3A, 3B:
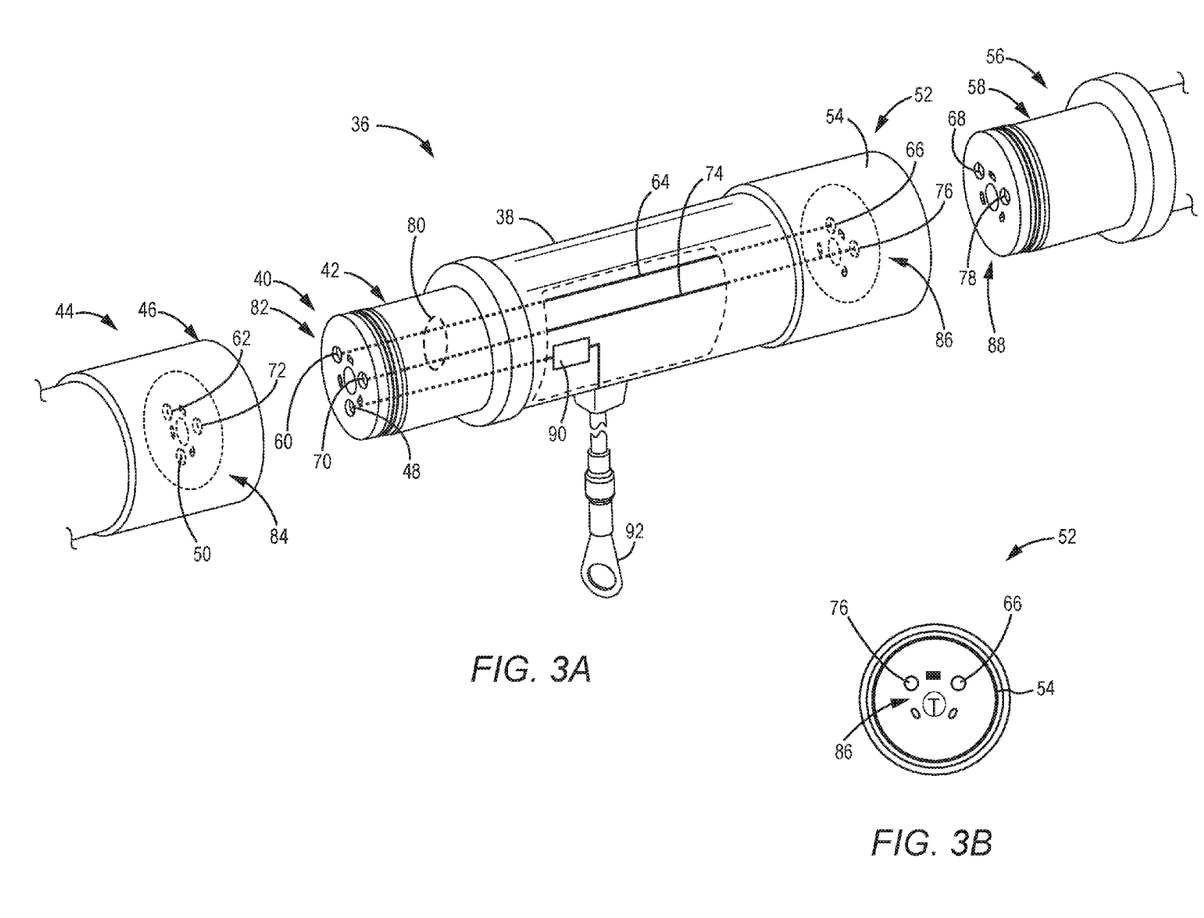
FIG. 3A illustrates a communication line adapter with electromagnetic interference (EMI) protection according to one embodiment.
FIG. 3B illustrates a view of one interface of the communication line adapter with EMI protection illustrated in FIG. 3A.

FIG. 3A illustrates a communication line adapter 36 with EMI protection according to one embodiment. The communication line adapter 36 includes a body 38 that, among other features, physically protects internal elements of the communication line adapter 36. The body 38 comprises a non-conductive housing. For example, the body 38 may comprise a housing made of plastic or rubber. The body 38 further includes a first interface 40 having a first predetermined shape 42 configured to be coupled to a first external interface 44 having a first complementary shape 46. The phrase "complementary shape" as used herein refers to a first shape that couples to a second shape closely, such that a surface of the first shape closely matches a surface of the second shape. In the embodiment illustrated in FIG. 3A, the first predetermined shape 42 is circular, and the first complementary shape 46 is also circular such that the first interface 40 fits into the first external interface 44 with precision when coupled. In other embodiments, the first predetermined shape 42 may be triangular, rectangular, or any other desired shape that fits with precision into a corresponding first complementary shape 46. Furthermore, in the embodiment illustrated in FIG. 3A, the first interface 40 is a male interface, and the first external interface 44 is a female interface, as the first interface 40 is configured to fit into the first external interface 44. The first interface 40 may also be configured as a female interface, and the first external interface 44 may be configured as a male interface, such that the first external interface 44 fits into the first interface 40. Further still, the first predetermined shape 42 and the first complementary shape 46 may be defined by a particular communication standard, such as the controller area network (CAN) bus standard.

The first interface 40 further includes an EMI shield contact 48 configured to be electrically coupled to an external EMI shield contact 50 of the first external interface 44. In another embodiment, the electrical coupling of the EMI shield contact 48 and the external EMI shield contact 50 may be defined by a particular communication standard, such as the CAN bus standard, and particularly section J1939/11 of the CAN bus standard, to provide EMI protection to a CAN bus network such as the CAN bus network 10 illustrated in FIG. 1.

The body 38 further includes a second interface 52 having a second predetermined shape 54 configured to be coupled to a second external interface 56 having a second complementary shape 58. In the embodiment illustrated in FIG. 3A, the second predetermined shape 54 is circular, and the second complementary shape 58 is also circular such that the second external interface 56 fits into the second interface 52 with precision when coupled. In other embodiments, the second predetermined shape 54 may be configured to receive a second complementary shape 58 that is triangular, rectangular, or any other desired shape, such that the second complementary shape 58 fits with precision into the second predetermined shape 54. Furthermore, in the embodiment illustrated in FIG. 3A, the second interface 52 is a female interface, and the second external interface 56 is a male interface, as the second external interface 56 is configured to fit into the second interface 52. The second interface 52 may also be configured as a male interface, and the second external interface 56 may be configured as a female interface, such that the second interface 52 is configured to fit into the second external interface 56. Further still, the second predetermined shape 54 and the second complementary shape 58 may be defined by a particular communication standard, such as the CAN bus standard.

The first interface 40 further includes a first data line contact 60 configured to be coupled to a first external data line contact 62 of the first external interface 44. The body 38 further includes a first data line 64 configured to carry a first electrical current from the first data line contact 60 through the communication line adapter 36 towards a second data line contact 66 of the second interface 52. The second data line contact 66 is configured to be coupled to a second external data line contact 68 of the second external interface 56. The first interface 40 further includes a third data line contact 70 configured to be coupled to a third external data line contact 72 of the first external interface 44. The body 38 further includes a second data line 74 configured to carry a second electrical current from the third data line contact 70 through the communication line adapter 36 towards a fourth data line contact 76 of the second interface 52. The fourth data line contact 76 is configured to be coupled to a fourth external data line contact 78 of the second external interface 56.

Although the first interface 40 is illustrated as having only three contacts (48, 60, and 70), the first interface 40 may include additional contacts. Further, the first data line 64 and the second data line 74 are illustrated as two straight lines forming a transmission medium 80 for simplicity, but the transmission medium 80 may be configured as a twisted pair transmission medium. The first data line contact 60 and the third data line contact 70 may comprise a first communication port 82, and the first external data line contact 62 and the third external data line contact 72 may comprise a first external communication port 84 to which the first communication port 82 is configured to be coupled. Further still, the second data line contact 66 and the fourth data line contact 76 may comprise a second communication port 86, and the second external data line contact 68 and the fourth external data line contact 78 may comprise a second external communication port 88 to which the second communication port 86 is configured to be coupled.

In addition, the first data line 64 and the second data line 74 may carry the first electric current and the second electric current, respectively, as a differential signal, such as a CAN bus differential signal. Accordingly, the first data line contact 60 and the third data line contact 70 may be configured to exchange a CAN bus differential signal with the first external data line contact 62 and the third external data line contact 72, respectively, of the first external interface 44 and may be configured to carry the CAN bus differential signal towards the second interface 52. Furthermore, the second data line contact 66 and the fourth data line contact 76 of the second interface 52 may be configured to exchange a bus differential signal, such as a CAN bus differential signal, with the second external data line contact 68 and the fourth external data line contact 78, respectively, of the second external interface 56.

Note that the second interface 52 differs from the first interface 40 in that the second interface 52 lacks an EMI shield contact. Accordingly, the second interface 52 does not provide the electrical current received at the EMI shield contact 48 of the first interface 40 to the second external interface 56. Instead, the communication line adapter 36 dissipates the electrical current received on the EMI shield contact 48. In that regard, the communication line adapter 36 includes an EMI reduction circuit 90 coupled to the EMI shield contact 48, configured to dissipate the electrical current received at the EMI shield contact 48 and protect the first data line 64 and the second data line 74 from EMI. The communication line adapter 36 further includes a ground connector 92 configured to electrically couple the EMI reduction circuit 90 to an external ground (not shown).

The EMI reduction circuit 90 may be physically located anywhere within the communication line adapter 36. However, EMI susceptibility is proportional to a length of un-shielded data lines carrying signals between the first external interface 44 and the second external interface 56, which includes any un-shielded portion of the transmission medium 80 inside the communication line adapter 36. Therefore, by way of non-limiting example, the EMI reduction circuit 90 is physically located near the second interface 52. This reduces the length of any un-shielded portion of the transmission medium 80, thus reducing the susceptibility of the transmission medium 80 to EMI. It is noted that a short un-shielded data line may be susceptible to EMI from higher frequencies (i.e., an un-shielded data line filters EMI from frequencies higher than c/length (in meters), where c=speed of light ($3.0 \times 10^{\hat{}}8$ meters/second)). However, in a white noise EMI environment, higher frequencies tend to have lower power and, thus, a minimal effect on overall EMI. Accordingly, a short un-shielded data line caused by locating the EMI reduction circuit 90 near the second interface 52 does not expose signals carried therein to significant EMI from higher frequencies. Therefore, locating the EMI reduction circuit 90 near the second interface 52 reduces the overall susceptibility of the transmission medium 80 to EMI.

The communication line adapter 36 is configured dissipate the electrical current received on the EMI shield contact 48 because some external interfaces, such as the second external interface 56, may not be configured to include an EMI shield contact to receive and dissipate such an electrical current. In that case, coupling the first external interface 44 to the second external interface 56 directly may leave the electrical current in the corresponding EMI shield and affect transmission through the first data line 64 and the second data line 74. Coupling the first external interface 44 and the second external interface 56 through the communication line adapter 36, on the other hand, dissipates the electrical current in the corresponding EMI shield, thus obviating the need for the second external interface 56 to do so. For example, with reference to FIG. 1, if the first external interface 44 corresponds to a connection from the CAN bus 12, and if the second external interface 56 corresponds to a connection of an electronic module 14 that does not provide circuitry to dissipate an electric charge accumulated at an EMI shield of the CAN bus 12, then connecting the communication line adapter 36 between the first external interface 44 and the second external interface 56 provides a path for dissipating an electric charge at the external EMI shield contact 50 from the CAN bus 12.

FIG. 3B illustrates a view of the second interface 52 of the communication line adapter 36 with EMI protection illustrated in FIG. 3A. The second interface 52 includes the second predetermined shape 54, the second data line contact 66, and the fourth data line contact 76. The second data line contact 66 and the fourth data line contact 76 may comprise the second communication port 86. These elements have been described in detail with reference to FIG. 3A, and thus further description is omitted herein. As noted above, the second interface 52 lacks an EMI shield contact to couple to an external EMI shield contact. Accordingly, the second interface 52 may be coupled to the second external interface 56 without providing an EMI shield coupling. Further, the coupling of the second interface 52 and the second external interface 56 may be defined by a particular communication standard, such as the CAN bus standard section J1939/15, which does not require such a coupling to provide a path to dissipate an EMI-related electric charge.

Figure 4:
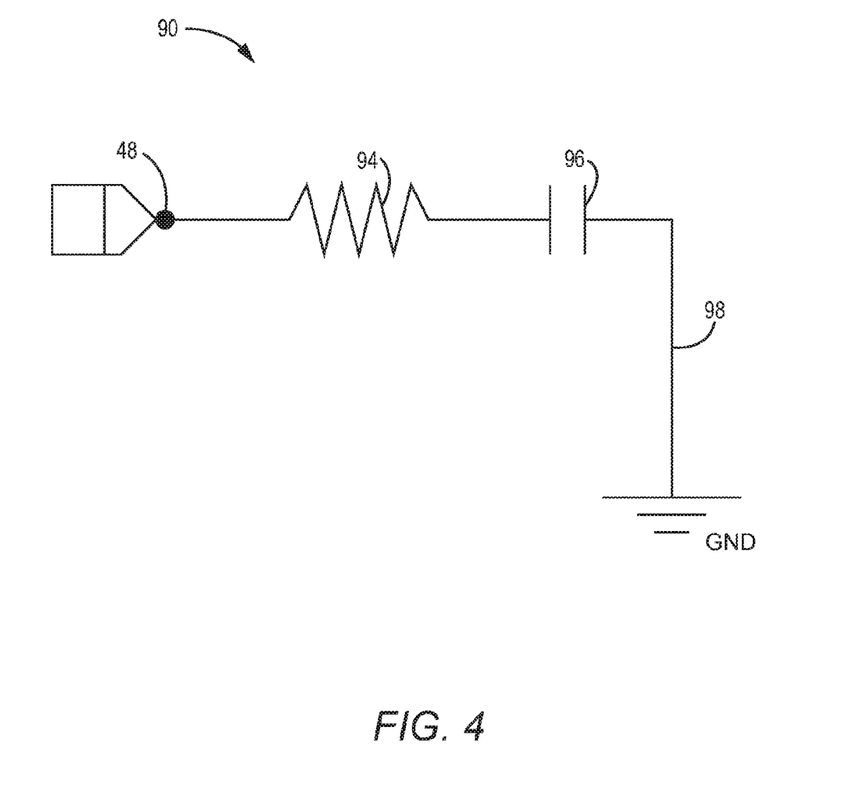
FIG. 4 is a schematic of an EMI reduction circuit of a communication line adapter for providing EMI protection according to one embodiment.

FIG. 4 is a schematic of the EMI reduction circuit 90 of the communication line adapter 36 for providing EMI protection according to one embodiment. The EMI reduction circuit 90 includes a resistor 94, a capacitor 96, and a ground line 98. The EMI reduction circuit 90 is configured to receive an electric charge from the EMI shield contact 48 and dissipate the electric charge through the resistor 94, the capacitor 96, and the ground line 98. The EMI reduction circuit 90 thus provides a shield termination for an external EMI contact of an external interface, such as the external EMI shield contact 50 of the first external interface 44, when a second external interface, such as the second external interface 56, does not provide such shield termination. The resistor 94 and capacitor 96 may comprise suitable characteristics sufficient to dissipate the electric charge. By way of non-limiting example, a value of the resistor 94 may be one (1) ohm, and the value of the capacitor 96 may be 0.68 microfarads (uF). However, the embodiments are not limited to any particular resistor 94 and capacitor 96, and the resistor 94 and the capacitor 96 may comprise any suitable electrical characteristics sufficient to dissipate an electric charge. Furthermore, embodiments are not limited to the resistor-capacitor circuit illustrated in FIG. 4. The EMI reduction circuit 90 may be, for example, any circuit including resistors, capacitors, inductors, or combinations thereof, suitable to receive an electric charge from the EMI shield contact 48 and dissipate an electric charge therein. Further still, the configuration of the EMI reduction circuit 90 and the values of the electrical components therein may be defined according to requirements of a particular communication standard such as, for example, the CAN bus standard.

Figure 5:
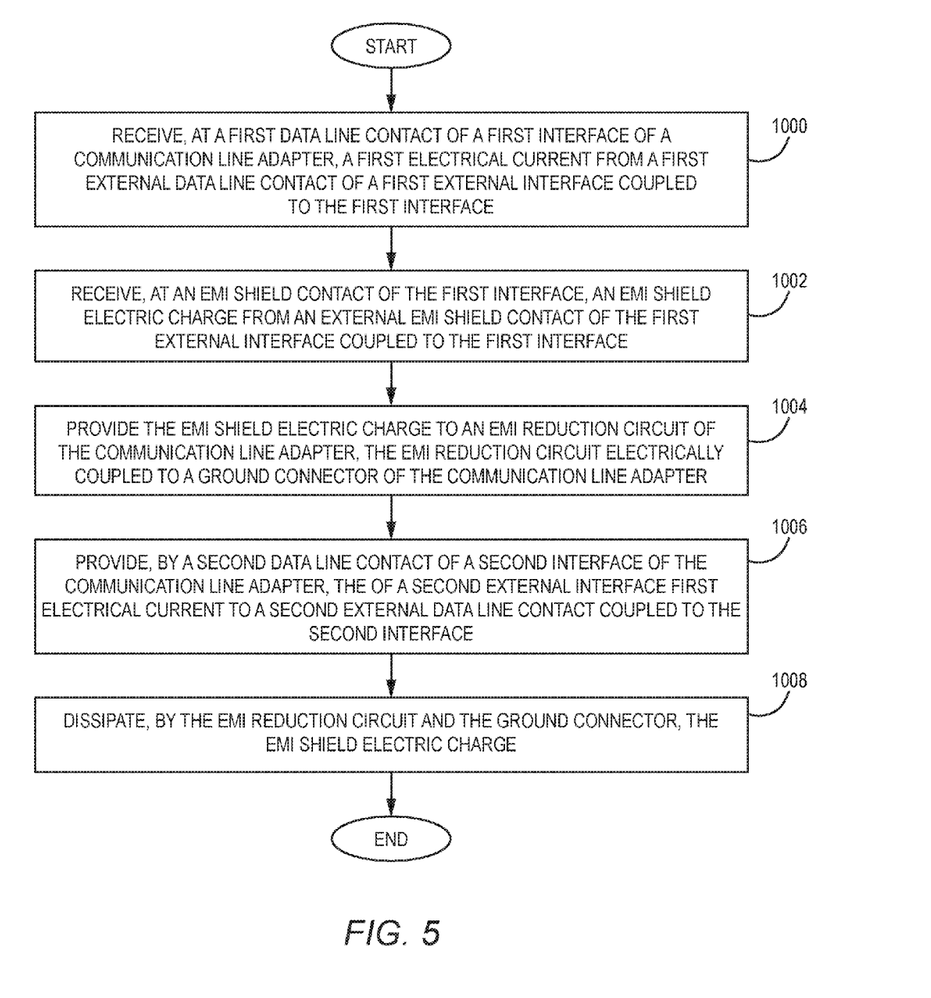
FIG. 5 is a flowchart of a method for reducing EMI at a communication line adapter according to one embodiment.

FIG. 5 is a flowchart of a method for reducing EMI at the communication line adapter 36 according to one embodiment. FIG. 5 will be discussed in conjunction with FIG. 3A. The communication line adapter 36 receives, at the first data line contact 60 of the first interface 40, a first electrical current from the first external data line contact 62 of the first external interface 44 coupled to the first interface 40 (block 1000). The communication line adapter 36 further receives, at the EMI shield contact 48 of the first interface 40, an EMI shield electric charge from an external EMI shield contact 50 of the first external interface 44 coupled to the first interface 40 (block 1002). The communication line adapter 36 then provides the EMI shield electric charge to the EMI reduction circuit 90. The EMI reduction circuit 90 is electrically coupled to the ground connector 92 of the communication line adapter 36 (block 1004).

The communication line adapter 36 then provides, by the second data line contact 66 of the second interface 52 of the communication line adapter 36, the first electrical current to the second external data line contact 68 of the second external interface 56 coupled to the second interface 52 (block 1006). The communication line adapter 36 then dissipates, by the EMI reduction circuit 90 and the ground connector 92, the EMI shield electric charge (block 1008). Accordingly, the communication line adapter 36 provides a discharge path for electric charge accumulated in a transmission medium of a communication network to reduce EMI on the transmission medium, thus allowing for more reliable data communications between electronic modules connected to the communication network. Furthermore, coupling at least some electronic modules to the communication network through a corresponding communication line adapter 36 allows for a proper discharge of an electric charge accumulated at an EMI shield of the transmission medium of the communication network regardless of whether the electronic modules are configured to digest a corresponding EMI shield line.

Figure 6:
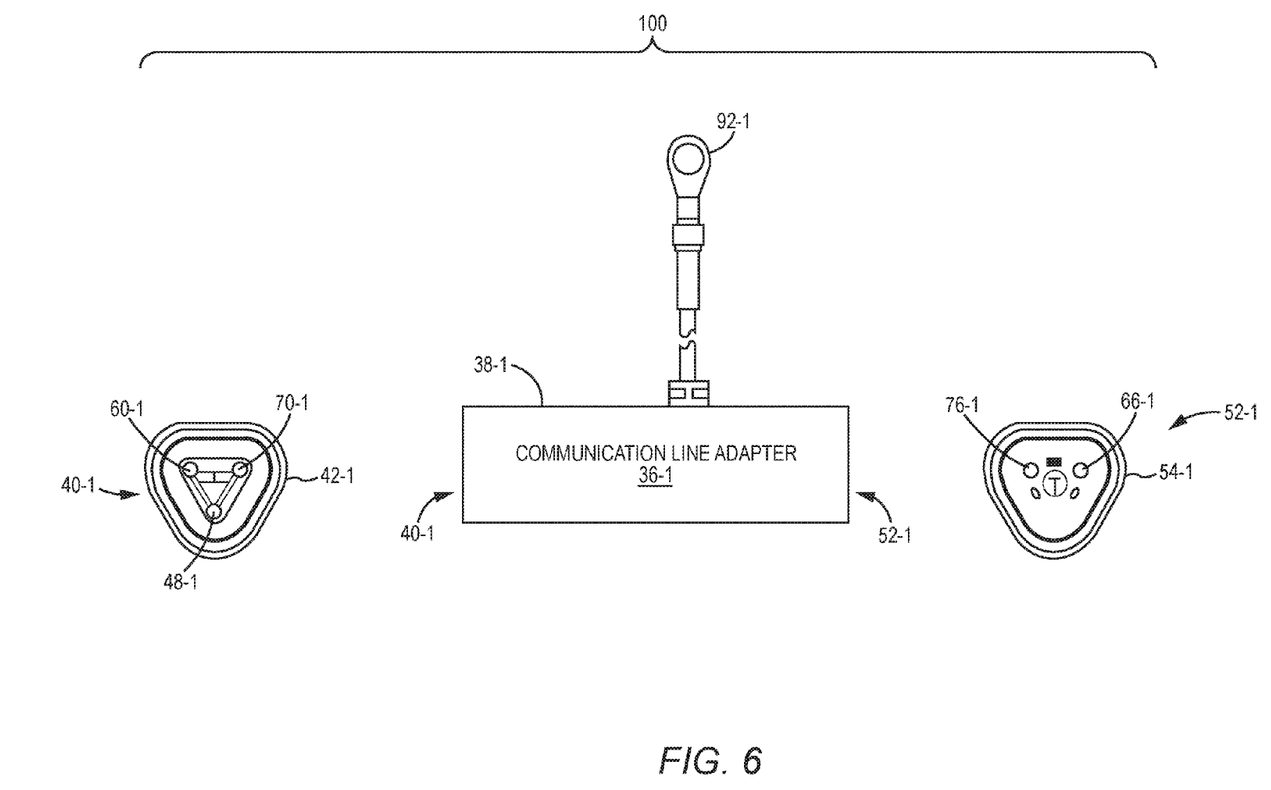
FIG. 6 illustrates a communication line adapter with EMI protection for use in a communication network according to section J1939 of a CAN bus standard according to one embodiment.

FIG. 6 illustrates a communication line adapter 100 with EMI protection for use in a communication network according to section J1939 of the CAN bus standard according to one embodiment. The communication line adapter 100 includes a body 38-1 that protects internal elements of the communication line adapter 100. The body 38-1 further includes a first interface 40-1 having a first predetermined shape 42-1 defined by section J1939 of the CAN bus standard.

The first interface 40-1 further includes an EMI shield contact 48-1 configured to be electrically coupled to an external EMI shield contact (not shown) according to a J1939/11 specification of the CAN bus standard to provide EMI protection to a CAN bus network such as the CAN bus network 10 illustrated in FIG. 1. The first interface 40-1 further includes a first data line contact 60-1 that is electrically coupled to a second data line contact 66-1 of a second interface 52-1. The first interface 40-1 further includes a third data line contact 70-1 that is electrically coupled to a fourth data line contact 76-1 of the second interface 52-1.

Data lines electrically coupling the data line contacts 60-1 and 70-1 of the first interface 40-1 to the data line contacts 66-1 and 76-1 of the second interface 52-1, respectively, are configured to carry a CAN bus differential signal. Accordingly, the first data line contact 60-1 and the third data line contact 70-1 may be configured as a communication port for receiving at the first interface 40-1 a CAN bus differential signal from an external communication port (not shown) and for carrying the CAN bus differential signal towards the second interface 52-1.

The body 38-1 further includes an EMI reduction circuit (not shown) corresponding to the EMI reduction circuit 90 described previously in conjunction with FIG. 3A. Therefore, a corresponding description is omitted herein. The body 38-1 further includes a ground connector 92-1 configured to attach the communication line adapter 100, and particularly a ground line of the EMI reduction circuit therein (not shown), to an external ground (not shown).

The body 38-1 further includes the second interface 52-1 having a second predetermined shape 54-1 defined by section J1939 of the CAN bus standard. It is noted that the second interface 52-1 lacks an EMI shield contact. Therefore, the second interface 52-1 is configured to be coupled to the second external plug (not shown) according to a J1939/15 specification of the CAN bus standard, which does not require such an interface to provide a path to dissipate an EMI-related electric charge.

The second interface 52-1 further includes the second data line contact 66-1 and the fourth data line contact 76-1. As noted earlier, data lines electrically couple the data line contacts 60-1 and 70-1 of the first interface 40-1 to the data line contacts 66-1 and 76-1 of the second interface 52-1, respectively. Accordingly, the second data line contact 66-1 and the fourth data line contact 76-1 may be configured as a communication port for providing at the second interface 52-1 a CAN bus differential signal received at the first interface 40-1.

Those skilled in the art will recognize improvements and modifications to the preferred embodiments of the disclosure. All such improvements and modifications are considered within the scope of the concepts disclosed herein and the claims that follow.

What is claimed is:

1. A communication line adapter comprising:
a body comprising:
a first interface comprising:
a first predetermined shape configured to be coupled to a first external interface having a first complimentary shape;
an electromagnetic interference (EMI) shield contact configured to be coupled to an external EMI shield contact of the first external interface; and
a first data line contact configured to be coupled to a first external data line contact of the first external interface;
a second interface comprising:
a second predetermined shape configured to be coupled to a second external interface having a second complimentary shape; and
a second data line contact configured to be coupled to a second external data line contact of the second external interface;
a first data line configured to carry a first electrical current from the first data line contact to the second data line contact; and
an EMI reduction circuit coupled to the EMI shield contact configured to protect the first data line from EMI.

2. The communication line adapter of claim 1, wherein:
the first interface further comprises a third data line contact configured to be coupled to a third external data line contact of the first external interface; and
the second interface further comprises a fourth data line contact configured to be coupled to a fourth external data line contact of the second external interface; and
the body further comprises a second data line configured to carry a second electrical current from the third data line contact to the fourth data line contact.

3. The communication line adapter of claim 2, wherein:
the first predetermined shape comprises a first shape defined by a controller area network (CAN) bus standard; and
the second predetermined shape comprises a second shape defined by the CAN bus standard.

4. The communication line adapter of claim 3, wherein:
the first interface is configured to be coupled to the first external interface to connect the EMI shield contact to the external EMI shield contact according to a J1939/11 specification of the CAN bus standard; and
the second interface is configured to be coupled to the second external interface according to a J1939/15 specification of the CAN bus standard.

5. The communication line adapter of claim 4, wherein:
the first interface comprises a male interface configured to be coupled to a female interface having the first complimentary shape; and
the second interface comprises a female interface configured to be coupled to a male interface having the second complementary shape.

6. The communication line adapter of claim 4, wherein:
the first interface comprises a female interface configured to be coupled to a male interface having the first complimentary shape; and
the second interface comprises a male interface configured to be coupled to a female interface having the second complementary shape.

7. The communication line adapter of claim 3, wherein the EMI reduction circuit comprises a shield termination circuit according to the CAN bus standard.

8. The communication line adapter of claim 3, wherein:
the first data line and the second data line are configured as a twisted pair to carry the first electric current and the second electric current, respectively, as a differential signal according to the CAN bus standard.

9. The communication line adapter of claim 2, wherein:
the first data line and the second data line are configured to carry the first electric current and the second electric current as a differential signal.

10. The communication line adapter of claim 1, the body further comprising a ground connector configured to attach to an external ground.

11. The communication line adapter of claim 10, wherein the EMI reduction circuit comprises a resistor, a capacitor, and a ground line.

12. The communication line adapter of claim 11, wherein:
the resistor is electrically coupled to the EMI shield contact;
the capacitor is electrically coupled to the resistor;
the resistor is electrically coupled to the ground line; and
the ground line is electrically coupled to the ground connector.

13. The communication line adapter of claim 1, wherein the body comprises a housing comprising a non-conductive material.

14. A method for reducing electromagnetic interference (EMI) at a communication line adapter, the method comprising:
receiving, at a first data line contact of a first interface of the communication line adapter, a first electrical current from a first external data line contact of a first external interface coupled to the first interface;
receiving, at an EMI shield contact of the first interface, an EMI shield electric charge from an external EMI shield contact of the first external interface coupled to the first interface;
providing the EMI shield electric charge to an EMI reduction circuit of the communication line adapter, the EMI reduction circuit electrically coupled to a ground connector of the communication line adapter;
providing, by a second data line contact of a second interface of the communication line adapter, the first electrical current to a second external data line contact of a second external interface coupled to the second interface; and
dissipating, by the EMI reduction circuit and the ground connector, the EMI shield electric charge.

15. The method of claim 14, further comprising:
receiving, at a third data line contact of the first interface, a second electrical current from a third external data line contact of the first external interface coupled to the first interface; and
providing, by a fourth data line contact of the second interface, the second electrical current to a fourth external data line contact of the second external interface coupled to the second interface, the first electrical current and the second electrical current providing a differential signal.

16. A communication line adapter comprising:
a body comprising:
a first interface comprising:
an electromagnetic interference (EMI) shield contact configured to be coupled to an external EMI shield contact; and
a first communication port configured to be coupled to a first external communication port;
a second interface comprising a second communication port configured to be coupled to a second external communication port;
a transmission medium configured to connect the first communication port to the second communication port; and
an EMI reduction circuit coupled to the EMI shield contact configured to protect the transmission medium from EMI.

17. The communication line adapter of claim 16, wherein:
the first communication port is configured to couple to the first external communication port according to a controller area network (CAN) bus standard; and
the second communication port is configured to couple to a second external communication port according to the CAN bus standard.

18. The communication line adapter of claim 17, wherein the EMI reduction circuit comprises a shield termination circuit according to the CAN bus standard.

19. The communication line adapter of claim 17, wherein the transmission medium comprises a twisted pair of data lines to carry a differential signal according to the CAN bus standard.

* * * * *